United States Patent
Boutaud De La Combe et al.

(10) Patent No.: US 8,040,887 B2
(45) Date of Patent: Oct. 18, 2011

(54) ENCAPSULATION OF E1-TYPE FRAMES UNDER ETHERNET

(75) Inventors: Xavier Boutaud De La Combe, Trebeurden (FR); Pierre Dupuy, Paris (FR); Alf Neustadt, Stuttgart (DE); Jean Thiberville, Trebeurden (FR)

(73) Assignee: Alcatel Lucent, Paris (FR)

( * ) Notice: Subject to any disclaimer, the term of this patent is extended or adjusted under 35 U.S.C. 154(b) by 1252 days.

(21) Appl. No.: 11/453,794

(22) Filed: Jun. 16, 2006

(65) Prior Publication Data
US 2007/0053364 A1 Mar. 8, 2007

(30) Foreign Application Priority Data
Jun. 17, 2005 (FR) ...................... 05 51654

(51) Int. Cl.
*H04L 12/56* (2006.01)
(52) U.S. Cl. ......................... 370/392; 370/466
(58) Field of Classification Search .......................... None
See application file for complete search history.

(56) References Cited

U.S. PATENT DOCUMENTS

| | | | | |
|---|---|---|---|---|
| 6,459,708 B1* | 10/2002 | Cox et al. | ....................... | 370/537 |
| 6,963,561 B1* | 11/2005 | Lahat | .......................... | 370/356 |
| 7,042,845 B1* | 5/2006 | Naumann | ..................... | 370/235 |
| 7,289,538 B1* | 10/2007 | Paradise et al. | ............... | 370/497 |
| 2004/0264961 A1* | 12/2004 | Nam et al. | ....................... | 398/58 |
| 2006/0153179 A1* | 7/2006 | Ho et al. | ........................ | 370/386 |

OTHER PUBLICATIONS

Vainshtein-Editior et al: "Unstructured TDM Circuit Emulation Service over Packet Switched Network." Oct. 2002, XP015005580.
Alexander V. et al "TDM Circuit Emulation Service over Packet Switched Network (CESoPSN) draft-vainshtein-cesopsn-02.txt" Aug. 2002, XP015005576.
Malis A. G.:"SONET/SDH Circuit Emulation over Packet (CEP)." vol. pwe3, No. 10, Feb. 2005, XP015026059.
Turner, R. B.: "Legacy telecom hits the 21st century: TDM circuits on Advanced TCA switch fabrics" May 2005, pp. 1-3, XP002367751.
Y(J) Stein et al: "TDM over IP" vol. pwe3, No. 3, Feb. 2005, XP015026066.

* cited by examiner

*Primary Examiner* — Chirag Shah
*Assistant Examiner* — Daniel Mitchell
(74) *Attorney, Agent, or Firm* — Carmen Patti Law Group, LLC

(57) ABSTRACT

An apparatus (D) is dedicated to processing E1 data frames in communications network equipment (ETPL) including at least one E1 line interface unit (LIU1). The apparatus (D) includes a processor adapted, on receiving from at least one E1 interface unit (LIU1) at least one E1-type frame addressed to a given E1 destination port, to encapsulate that E1-type frame in a payload data field of an Ethernet frame in order to send it to an Ethernet destination port providing access to the given E1 destination port.

19 Claims, 2 Drawing Sheets

ENCAPSULATION OF E1-TYPE FRAMES UNDER ETHERNET

The invention relates to transport networks and more particularly to interconnecting plesiochronous digital hierarchy (PDH) type transport networks and asynchronous transport networks.

BACKGROUND OF THE INVENTION

As the person skilled in the art is aware, to each type of transport network there corresponds at least one type of data transport frame. Thus in PDH-type synchronous networks data is sent in the form of E1-type frames and in similar frames (in particular T1, J1, E2, T3 and J3 frames) whereas in asynchronous networks data may be sent in the form of Ethernet frames.

For a network of a second type (for example Ethernet) to be able to transport frames coming from a network of a first type (PDH) transparently, without losing information and if possible with a low and guaranteed transmission delay, the connection interfaces of the networks must include equipment capable of converting (for example encapsulating) at least some of the frames that they receive.

Various solutions for effecting such conversion have been proposed.

The PICMG standardization body has proposed a solution known as I-TDM consisting in transporting over Ethernet TDM (time division multiplex) channels containing some of the data contained in the E1-type frames. A drawback of that technique is that the TDM data bytes are extracted from the E1 frame by E1 frame builders (also known as E1 framers), which is less than the optimum for implementing certain functions offered by certain recent architectures known as frame termination architectures, such as the aTCA architecture, because of the presence in the Ethernet frame of a header for each TDM channel (also known as the overhead).

An aTCA architecture offers telecommunications equipment modularity but does not offer independence of E1-type line protection (automatic protection switching (APS)) and line termination board protection (equipment protection switching (EPS)).

The IETF standardization body, and more particularly its working group PWE3, has proposed a CES (circuit emulation services) solution and a solution for transporting TDM channels over the Internet Protocol known as TDMoIP (TDM over IP). Those two solutions consist in Internet Protocol (IP) transport protocols whose respective transport layers generate large headers and therefore limit the transport capacity of the network, i.e. the number of E1-type links (or lines) that can be transported by a network of the Giga Ethernet type.

SUMMARY OF THE INVENTION

An object of the invention is to improve on this situation, and among other things to enable Transport over Ethernet of E1 frames, for example in an aTCA architecture.

To this end the invention proposes a processor apparatus for use in a communications network equipment for processing E1-type data frames.

The apparatus is characterized in that it includes processor means adapted on receiving at least one E1-type frame addressed to a given E1 destination port to encapsulate said received E1-type frame in a payload data field of an Ethernet frame in order to send it to an Ethernet destination port providing access to said given E1 destination port.

The apparatus of the invention may have other features and in particular, separately or in combination:

its processor means may be adapted, on receiving a plurality of E1-type frames addressed to a common Ethernet destination port providing access to their respective given E1 destination ports: firstly to group at least some of said E1-type frames to constitute at least one group of at most n E1-type frames; secondly to associate with each group a control header comprising data that represents it; and thirdly to encapsulate the E1-type frames of each group and the associated control header in a payload data field of an Ethernet frame in order to send it to the common Ethernet destination port.

its processor means may be adapted to deliver periodically an Ethernet frame including at most n E1-type frames and the associated control header addressed to a common Ethernet destination port;

its processor means may be adapted in the event of grouping a number of E1-type frames greater than n to build at least two Ethernet frames each comprising at most n E1-type frames designating the same common Ethernet destination port;

the number n of E1-type frames in a group is an integer from 1 to 46, preferably from 1 to 32;

its processor means may be adapted to integrate into at least some of the control headers data representing an Ethernet frame number and/or a sequence number and/or synchronization information;

its processor means may be adapted to add a header comprising data representing at least its given E1 destination port to each E1 frame received before encapsulating said E1 frame and the added header in said payload data field of an Ethernet frame;

its processor means may be adapted to integrate into at least some of the headers added to the E1-type frames data representing the frame type and/or at least one frame status and/or timing justification information (known as "stuffing", which may be negative, zero, or positive);

its processor means may be adapted on receiving an Ethernet frame encapsulating at most n E1-type frames to extract said encapsulated E1-type frames from said Ethernet frame in order to deliver them to outputs providing access to their respective given E1 destination ports.

The invention also proposes E1-type line physical terminal equipment for use in a communications network, including at least one E1-type line interface unit adapted to receive E1-type data frames and at least one processor apparatus of the above type coupled to said E1-type line interface unit in order to exchange E1-type frames with it.

The invention further proposes E1-type line logical termination equipment for use in a communications network, comprising:

at least one processor apparatus of the above type adapted to exchange Ethernet frames encapsulating at most n E1-type frames with an E1-type line physical termination equipment of the above type; and framer means fed with E1-type frames by the E1-type logical termination card and adapted to extract from said E1-type frames the channels that they contain, and optionally:

processor means adapted to process said channels extracted by said framer means.

The invention further proposes frame switching equipment for use in an asynchronous communications network, comprising:

at least one Ethernet frame switch having at least one input adapted to receive Ethernet frames generated by an E1-type line physical termination equipment of the above type and adapted to switch each Ethernet frame received to an output selected as a function of instructions; and at least one E1-type line logical termination equipment of the above type fed with Ethernet frames by said Ethernet frame switch.

BRIEF DESCRIPTION OF THE DRAWINGS

Other features and advantages of the invention become apparent on reading the following detailed description and examining the appended drawings, in which.

The appended drawings constitute part of the description of the invention and may, if necessary, contribute to the definition of the invention.

DETAILED DESCRIPTION OF THE INVENTION

An object of the invention is to enable Transport over Ethernet of E1-type data frames coming from a PDH-type plesiochronous transport network, in particular in an aTCA architecture.

The data frames to be transported over Ethernet considered below by way of non-limiting example are E1-type frames. The invention is not limited to this type of frame, however. It relates to all E1 frames coming from a PDH-type plesiochronous transport network and in particular T1, J1, E3, T3 and J3 frames.

Figure 1:
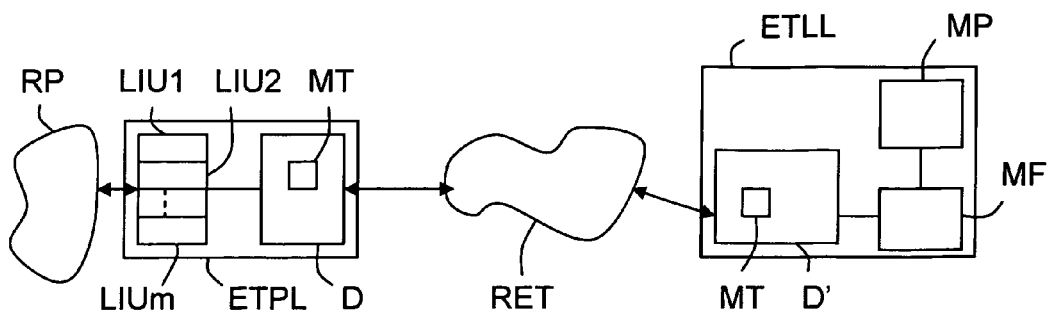
FIG. 1 is a functional block diagram of one embodiment of an E1 line physical termination equipment including an E1 frame processor.

A first embodiment of the invention is described first with reference to FIG. 1. In this first embodiment, a PDH (plesiochronous digital hierarchy) plesiochronous network is connected to an asynchronous network RET of the Ethernet type via a first network equipment ETPL. The Ethernet network RET is connected to a second network equipment ETLL.

The first network equipment ETPL is an E1 line physical termination equipment. It physically terminates E1 lines (or connections) set up between the PDH network RP and the Ethernet network RET and encapsulates E1 frames that it receives in Ethernet transport frames. To this end it includes at least one E1 line interface unit LIUi coupled to at least one E1 frame processor apparatus D.

The number of E1 line interface units LIUi depends on the number of links set up between the PDH network and the first network equipment ETPL. Here that number is equal to m (i=1 to m) but can take any integer value greater than 0. For example m is equal to 256. The inputs/outputs of each line interface unit LIUi define E1 ports. Also, the number of processor apparatuses D depends on the number of Ethernet interfaces to which the first network equipment ETPL is coupled. Here that number is equal to 1 but can take any integer value greater than 0.

Each line interface is a line interface unit (LIU), for example. It physically (rather than logically) terminates an E1 line (or connection) set up between the PDH network RP to which it is connected and the Ethernet network RET. A line interface unit LIUi recovers the timing of the E1 frames that it receives and identifies the "time/bit" in order to associate the recovered timing therewith.

Each line interface unit LIUi has an output feeding the processor apparatus D with E1 frames that it receives from the PDH network RP.

According to the invention, the processor apparatus D includes a processor module MT which, when it receives at least one E1 frame from at least one line interface unit LIUi and addressed to a given destination port E1 of a framer module MF described later, encapsulates the E1-type frame in a payload data field DATA of an Ethernet frame TE in order to send it to an Ethernet destination port providing access to the given E1 destination port.

If the assignment of the E1 lines to fixed E1 destination ports of a framer module MF is not fixed, the processor module MT also adds to each E1 frame received a header ETi containing data representing at least its given E1 destination port before encapsulating it in the payload data field DATA of an Ethernet frame TE.

To optimize the transmission of E1 frames addressed to a common Ethernet destination port providing access to their respective given E1 destination ports the processor module MT is configured to group together a plurality of E1 frames received via line interface units LIUi and designating the same Ethernet destination port in order, where appropriate, to add a header to each of them (when assignment is not fixed) and then to encapsulate the E1 frames (where applicable with their added headers ETi) in the same Ethernet frame TE. Each group constitutes a set of at most n E1 frames (where applicable with their added headers) addressed to the same common Ethernet destination port. The maximum number n of E1 frames in a group may be equal to 32, for example, but can be as high as 46 (n=46). The number of E1 frames in a group may vary from one Ethernet frame to another, for example as a function of the number of E1 frames addressed to the same common Ethernet destination port received by the processor module MT, although it must not exceed the maximum value n.

If the number p of E1 frames received and addressed to the same common Ethernet destination port is less than n the resulting group includes only p E1 frames. On the other hand, if the number p of E1 frames received and addressed to the same common Ethernet destination port is greater than n the processor module MT produces at least two groups each including at most n E1 frames.

As indicated above, if E1 line assignment is not fixed, the processor module MT can add to each E1 frame of a group a header ETi containing data representing at least its given E1 destination port.

The processor module MT then associates each group with a control header EC representing in particular its E1 frames (where applicable with their added headers). A set of E1 frames (where applicable with their added headers) and the associated control header EC constitute a group nE1. The processor module MT then encapsulates the group nE1 in the DATA field of an Ethernet frame TE dedicated to payload data.

Figure 2:
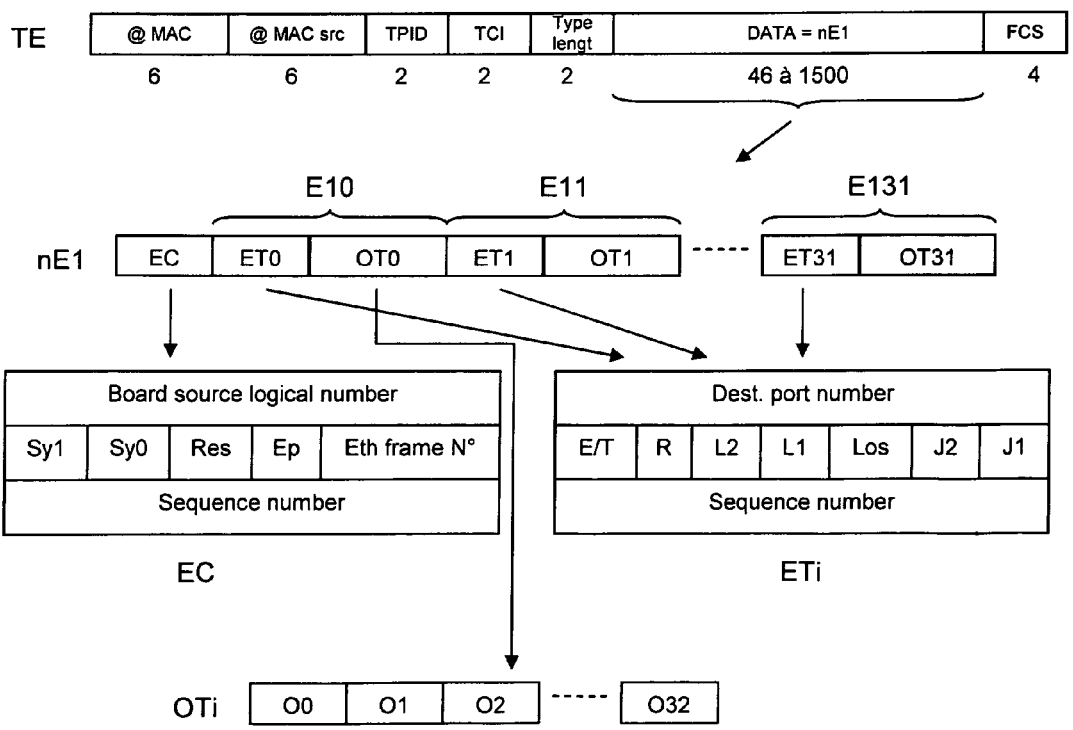
FIG. 2 is a diagram of an Ethernet frame and in particular its payload data field (DATA) which contains E1 frames encapsulated in accordance with the invention.

FIG. 2 is a diagram of one example of an Ethernet frame TE generated by the processor apparatus D. In this example, the DATA field of the Ethernet frame TE dedicated to payload data comprises a group nE1 consisting of a control header EC and 32 (n=32) E1 frames E10 to E131. Each frame E1i here includes an added header ETi and payload data OTi arranged in the form of at most 33 bytes O0 to O32.

An E1 frame usually contains at most 32 bytes. Here the $33^{rd}$ byte transports the $257^{th}$ bit, if any, of the E1 frame that is constructed in each period, here every 125 microseconds (µs) (see below).

As indicated above, if E1 line assignment is not fixed the header ETi added to each frame E1$i$ of a group nE1 includes a "Dest. port number" field whose value designates the number of the logical termination port to which the E1 frame is addressed (and therefore the E1 port number of a framer module MF of a second E1 link logical termination equipment ETLL (see below)). The common Ethernet destination port of an Ethernet frame is then one of the ports of the second E1 link logical termination equipment ETLL.

As shown in FIG. 2, an added header ETi contains one or more further and complementary fields.

Thus the processor module MT can incorporate in an auxiliary field E/T at least some of the added headers ETi of the data representing the encapsulated frame type. This field E/T is used when the line interface units LIUi receive from the PDH network(s) frames of different types, for example E1 and T1 (or J1) frames. The value of the field E/T then indicates the type of frame containing the added header ETi that includes it.

The processor module MT can also integrate into two other auxiliary fields L2 and L1 at least some of the added headers ETi of the data representing at least one encapsulated frame status. In the direction from a second equipment ETLL (see below) to the first equipment ETPL, these fields L2 and L1 are used to command internal and/or external loopback tests, for example. In the direction from the first equipment ETPL to a second equipment ETLL, the values of the fields L2 and L1 indicate the status of the frame containing the added header ETi that includes them.

The processor module MT can also integrate into another auxiliary field Los at least some of the added headers ETi of the data representing loss of synchronization. This field Los is used when an LOS status has been detected for a line interface unit LIUi of a first equipment ETPL. The value of the Los field indicates to the second equipment ETLL that the line interface unit LIUi of the first equipment ETPL has lost the bit synchronization (bit timing) of the E1 link concerned.

The processor module MT can also integrate into two other auxiliary fields J2 and J1 at least some of the added headers ETi of encapsulated frame justification bits. For example, these fields J2 and J1 indicate any timing offset of an encapsulated frame relative to a specified timing. This is called "stuffing".

The E1-type frames of a group nE1 come from different line interface units LIUi and may therefore have their own timing. To determine the timing offset of a frame relative to a specified timing an FIFO (first in first out) memory is generally used whose content (stuffing bits) is read at a frequency of 8 kHz, for example. There is therefore a FIFO-type memory for each E1 line. In each period of observation of an FIFO memory (here every 125 µs), if there are 256 bits in the FIFO memory, the timing corresponds to the specified timing, in which case there is no justification, if there are 255 bits in the FIFO memory the timing is below the specified timing, in which case the justification is referred to as negative justification, and if there are 256 bits in the FIFO memory the timing is above the specified timing, in which case the justification is referred to as positive justification. It is this $257^{th}$ bit that may be integrated into the $33^{rd}$ byte reserved for an E1 frame in an Ethernet frame TE. Thus the synchronization information can be transported using a single specified timing.

The control header EC associated with a group of frames E1 (where applicable with their added headers ETi) preferably includes an "Eth. frame No" field used when the processor module MT generates a sequence of Ethernet frames TE because a number p of E1 frames addressed to the same common Ethernet destination port greater than n has been received. The value of this field then indicates the position of the Ethernet frame to which it belongs relative to the other Ethernet frames of the same sequence.

The control header EC may equally include a "Sequence number" field for detecting loss or desequencing of Ethernet frames TE (also known as Ethernet packets, as opposed to the E1 frames coming from a PDH network). The value of this "Sequence number" field is therefore used to verify if Ethernet frames have been lost.

The control header EC can also include two further fields "Sy1" and "Sy0" whose values represent synchronization information in respect of Ethernet frames TE. These frames are useful if synchronization between a sender (here a first network equipment ETPL) and a receiver (here a second network equipment ETLL) uses an "in band" synchronization mechanism.

In band synchronization entails sending to the second network equipment ETLL Ethernet frames (or packets) including a label indicating that they are synchronizing frames, either by generating dedicated Ethernet frames in the processor apparatus D or by the processor apparatus D using a synchronization field in an Ethernet data frame TE. The second network equipment ETLL recreates the timing using these synchronizing Ethernet frames (or packets) or the value of the synchronization field it receives.

An "out band" synchronization mechanism may be used instead of an in band synchronization mechanism, but this necessitates a dedicated non-IP link between a sender (ETPL) and a receiver (ETLL).

The processor module MT can also be adapted to support a remote and/or dynamic configuration control protocol. This kind of control protocol can be executed on top of the Internet Protocol, for example, and by means of an in band or out band mechanism.

The processor module MT can also be adapted to participate in an in band supervision mechanism for detecting problems on the physical links carrying the Ethernet frames TE. The processor module MT sends in parallel with the Ethernet frames TE supplementary supervision frames that the addressees use to determine if they can contact it. Similarly, the processor module MT uses supervision frames that it receives from the addressees to determine if they can be contacted.

Periodically (for example every 125 µs) the processor apparatus D sends the Ethernet frames TE containing the encapsulated E1 frames to a second network equipment ETLL (see above), one of the Ethernet ports of which is the common Ethernet destination port of said Ethernet frames TE, and which contains an equipment (framer module MF) having at least one E1 destination port.

The second network equipment ETLL (when operating as a receiver, see FIG. 1) is an E1 line logical termination equipment. It logically terminates E1 lines (or connections) set up between the PDH network RP and the Ethernet network RET in order to extract the channels that are contained in the E1-type frames ETi encapsulated in the Ethernet frames TE sent by the first network equipment ETPL when operating as a sender.

Here the expression "logically terminating E1 lines" refers to extracting the TDM channels that are contained in the E1 frames that the respective E1 lines contain.

It is important to note that the first equipment ETPL does not operate exclusively as a sender and that the second equipment ETLL does not operate exclusively as a receiver. They both operate bidirectionally, one sending when the other is receiving and vice-versa.

This is why the second network equipment ETLL includes at least one E1 frame processor apparatus D' similar to the processor apparatus D described above.

When the processor apparatus D' is operating as a receiver, its processor module MT extracts from each Ethernet frame TE generated by the processor apparatus D of a (first) E1 line physical termination equipment ETPL the E1-type frames that are encapsulated therein, the number of which is at most equal to n, together with their respective destination ports E1.

Moreover, when the processor apparatus D' is operating as a sender, its processor module MT builds Ethernet frames TE encapsulating at most n E1-type frames. In this case, the apparatus D of a (first) equipment ETPL operates as a receiver and its processor module MT extracts from each Ethernet frame TE generated by the apparatus D' the E1-type frames that are encapsulated therein in order to send them to the line interface units LIUi concerned, as a function their respective E1 destination ports.

The output of the processor apparatus D' feeds E1 frames, grouped together where appropriate, to an E1 framer module MF. If the processor apparatus D' receives a sequence of Ethernet frames TE including encapsulated E1 frames addressed to E1 destination ports of the framer module MF, its processor module MT disencapsulates the E1 frames and presents them to the correct (destination) E1 port of the framer module MF by analyzing the value of the "Dest. port number" field of the associated header.

The framer module MF extracts from the E1 frames that it receives the respective TDM channels that they contain using a technique conforming to the G.704 Standard and familiar to the person skilled in the art.

The output of the framer module MF feeds a channel processor module MP of a type depending on the application for which the second equipment ETLL is designed.

Figure 3:
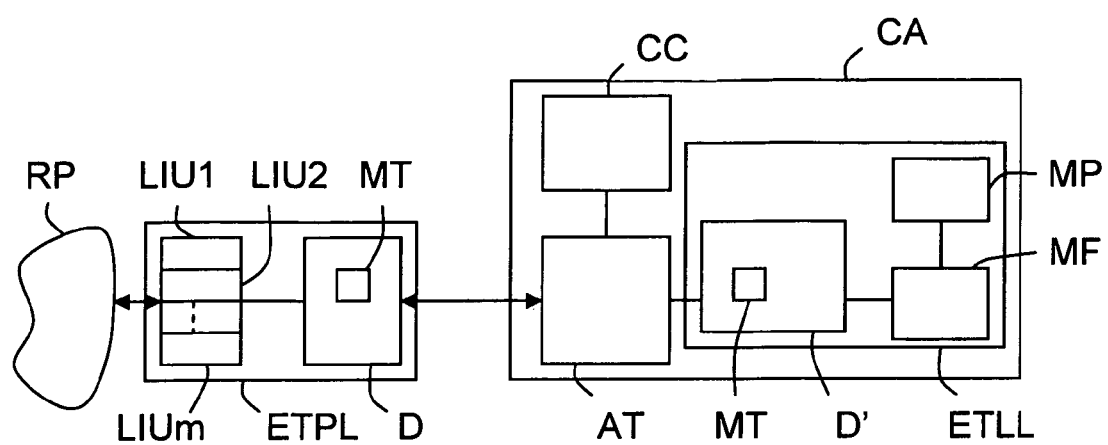
FIG. 3 is a functional block diagram of one embodiment of an E1 line physical termination equipment including an E1-type frame processor apparatus of the invention coupled to one embodiment of a frame switching equipment of the invention also including an E1 frame processor apparatus of the invention in an aTCA architecture.

An embodiment of the invention relating to an aTCA-type architecture is described next with reference to FIG. 3. The invention is not limited to this type of architecture, however. It applies to all Transport over Ethernet of E1-type frames.

In this second embodiment, the PDH plesiochronous network is connected to a second network equipment CA via a first network equipment ETPL conforming to an aTCA architecture.

From the functional point of view, the first network equipment ETPL is substantially identical to that described above with reference to FIG. 1 and the E1 line physical termination equipment ETPL will therefore not be described again. In an aTCA architecture it constitutes an "auxiliary shelf".

In an aTCA architecture, the second network equipment CA is an aTCA rack CA that logically terminates the E1 lines. It may be connected to an Internet Protocol (IP) network via an internal application (MP) in order to communicate to it data extracted from the TDM channels contained in the E1-type frames that are encapsulated in the Ethernet frames that it receives from a first equipment ETPL.

The rack CA contains at least one Ethernet frame switch AT and at least one E1 line logical termination equipment ETLL of the type described above with reference to FIG. 1 which is coupled to the AT frame switch and which in an aTCA architecture constitutes a "main shelf", where applicable with a control card CC coupled to the frame switch AT.

It is important to note that the rack CA can contain a plurality of frame switches AT and a plurality of E1 line logical termination equipments (main shelves) ETLL. The frame switch AT could be external to the rack CA or even form part of the first equipment ETPL, however.

The frame switch AT switches Ethernet frames ET that it receives at each of its inputs coupled to one or more processor apparatuses D of one or more first equipments ETPL to one of its outputs coupled to main shelves ETLL, where applicable as a function of instructions received from the control card CC.

The main shelf ETLL is substantially identical to the second network equipment ETLL described above with reference to FIG. 1 and the E1 line logical terminating equipment ETLL will therefore not be described again.

The processor apparatus D, D' of the invention, and in particular its processor module MT, may take the form of electronic circuits software (or electronic data processing) modules, or a combination of circuits and software.

The invention may be used in equipments having a switching architecture based on Ethernet switches, for example those used in telecommunications equipments known as voice media gateways (MGW), base station controllers (BSC) and radio network controllers (RNC), or in nodes of the SGSN type.

Because of the invention, in an aTCA-type architecture, lines may be physically terminated in an auxiliary shelf different from the main shelf and external to the rack that contains it. Consequently, in equipment based on the aTCA architecture, effective independence of line protection (automatic protection switching (APS) provided by the auxiliary shelf ETPL) and line termination board protection (equipment protection switching (EPS) provided by the main shelf ETLL) can be assured.

The invention is not limited to the processor apparatus, E1-type line physical termination equipment, E1-type line logical termination equipment and frame switching equipment embodiments described above by way of example only, and encompasses all variants that the person skilled in the art might envisage that fall within the scope of the following claims.

Thus an embodiment of the invention is described above in relation to E1 frames. However, the invention is not limited to that type of frame. It also relates to encapsulating in Ethernet frames any E1-type frames coming from a PDH-type plesiochronous transport network, in particular T1, J1, E3, T3 and J3 frames.

What is claimed is:

1. Switching equipment apparatus for use in a communications network for processing E1-type data frames, the switching equipment:

comprising an interface that receives at least one E1-type data frame addressed to a given E1 destination port; and a processor that groups at least some of said E1-type data frames to constitute at least one group of at most n E1-type data frames, where the at most n E1-type data frames is grouped based on a common Ethernet destination port providing access to a respective E1 destination port of each E1-type data frame;

associates with each group a control header comprising data that represents the group; and encapsulates the E1-type data frames of each group and the associated control header in a payload data field of an Ethernet frame to send the Ethernet frame to said common Ethernet destination port; and wherein the respective common Ethernet destination port provides access to the plurality of destination E1 ports.

2. The switching equipment according to claim 1, wherein said equipment periodically delivers an Ethernet frame comprising at most n E1-type data frames and the associated control header addressed to a common Ethernet destination port.

3. The switching equipment according to claim 1, wherein said equipment, in the event of grouping a number of E1-type data frames greater than n, builds-at least two Ethernet frames each comprising at most n E1-type data frames designating the same common Ethernet destination port.

4. The switching equipment according to claim 1, wherein the number n of E1 frames in a group is an integer from 1 to 46.

5. The switching equipment according to claim 1, wherein said equipment integrates into at least some of the control headers data representing an Ethernet frame number or a sequence number and/or synchronization information.

6. The switching equipment according to claim 1, wherein said equipment adds a header comprising data representing at least said given E1 destination port to each E1 frame received before encapsulating said E1 frame and the added header in said payload data field of an Ethernet frame.

7. The switching equipment according to claim 6, wherein said equipment integrates into at least some of the headers added to the E1-type data frames data representing the frame type or at least one frame status and/or timing justification information.

8. The switching equipment according to claim 1, wherein said equipment upon receiving an Ethernet frame encapsulates at most n E1 frames to extract said encapsulated E1 frames from said Ethernet frame to deliver them to outputs providing access to their respective given E1 destination ports.

9. E1-type line physical termination equipment (ETPL) for use in a communications network, the E1-type line physical terminal equipment comprises:
   at least one E1 line interface unit that receives E1 data frames and
   at least one switching equipment according to claim 1 coupled to said E1 line interface unit in order to exchange E1 frames with it.

10. E1-type line logical termination equipment for use in a communications network, the E1-type line logical termination equipment comprises:
   i) at least one switching equipment according to claim 1 that exchanges Ethernet frames encapsulating at most n E1 frames with an E1 line physical termination equipment,
      said E1 line physical termination equipment comprising at least one E1 line interface unit that receives E1 data frames and at least one said switching equipment coupled to said E1 line interface unit in order to exchange E1 frames with the E1 line interface unit and
   ii) a framer that is fed with E1 frames by said switching equipment and extracts from said E1 frames the channel that the E1 frames contain.

11. E1-type line logical termination equipment according to claim 10, wherein the E1-type line logical termination equipment comprises a processor that processes said channels extracted by said framer.

12. Frame switching equipment for use in an asynchronous communications network, the frame switching equipment comprises:

i) at least one Ethernet frame switch (AT) comprising at least one input that receives Ethernet frames generated by an E1 line physical termination equipment,
      said E1-type line physical terminal equipment comprising at least one E1 line interface unit that receives E1 data frames and
      at least one switching equipment, the switching equipment receiving at least one E1-type data frame addressed to a given E1 destination port, and encapsulating said received E1-type data frame in a payload data field of an Ethernet frame to send the Ethernet frame to an Ethernet destination port providing access to said given E1 destination port, where the Ethernet frame that is sent consists of layer 2 header information and the payload data field of the Ethernet frame, according to claim 1 coupled to said E1 line interface unit in order to exchange E1 frames with the E1 line interface unit and switch each Ethernet frame received to an output selected as a function of instructions and
   ii) at least one E1 line logical termination equipment fed with Ethernet frames by said Ethernet frame switch (AT), said E1 line logical termination equipment comprising:
      a) at least one said switching equipment according to claim 1 that exchanges Ethernet frames encapsulating at most n E1 frames with an E1 line physical termination equipment,
         said E1 line physical termination equipment comprising at least one E1 line interface unit that receives E1 data frames and
         at least one said switching equipment according to claim 1 coupled to said E1 line interface unit in order to exchange E1 frames with the E1 line interface unit; and
      b) a framer means fed with E1 frames by said switching equipment according to claim 1 that extracts from said E1 frames the channel that said E1 frames contain.

13. The switching equipment according to claim 1, wherein the at least one E1-data frame is received on a first network equipment comprising a plurality of processor modules and the Ethernet frame is sent to a second network equipment comprising a plurality of processor modules; wherein the given E1 destination port is an E1 destination port of a framing module.

14. A method for a processor apparatus for use in a communications network for processing TDM data frames, wherein the method comprises:
   receiving a plurality of TDM data frames where each received TDM data frame is addressed to a destination Ethernet port where the destination Ethernet port provides access to an E1 destination port of each TDM data frame wherein a destination Ethernet port provides access to the E1 destination port;
   associating a header with each received TDM data frame;
   forming a group comprising at least one TDM data frame comprising a same destination Ethernet port that provides access to an E1 destination port of each TDM data frame, where the same destination Ethernet port provides access to a plurality of destination E1 ports and the E1 destination port comprises the at least one TDM frame when the processor apparatus receives the at least one TDM frame;
   associating with the group of at least one TDM data frame a control header;

encapsulating the group comprising the control header, the at least one TDM data frame and the header associated with each at least one TDM data frame, in a payload data field of an Ethernet frame where the Ethernet frame consists of layer 2 header information, and the Ethernet payload data field; and sending the Ethernet frame to the same destination Ethernet port.

15. The method of claim 14 wherein the header associated with each received TDM data frame comprises a destination port number where the destination port number comprises the logical TDM port to which the TDM frame is addressed.

16. The method of claim 15 wherein the header associated with each received TDM data frame further comprises:

a sequence number, an L1 field and an L2 field where the L1 field and the L2 field indicates a direction of the Ethernet frame sent between two processor apparatus; an E/T field which indicates a TDM data frame type, an LOS field where the LOS field indicates status of bit synchronization; a J1 field and a J2 field where the J1 field and the J2 field indicate a timing offset.

17. The method of claim 14 wherein the control header further comprises an Ethernet frame number and a sequence number where the Ethernet flame number indicates the relative position of an Ethernet frame in a plurality of Ethernet frames comprising a sequence of Ethernet frames that are sent to a common destination Ethernet port and the sequence number indicates if a packet has been lost.

18. The method of claim 17 wherein the control header further comprises a SY1 field and an SY0 field which indicates synchronization information of an Ethernet frame.

19. The method according to claim 14, wherein the plurality of TDM data frames are received on a first network equipment comprising a plurality of processor modules and the Ethernet frame is sent to a second network equipment comprising a plurality of processor modules; and wherein the E1 destination port is an E1 destination port of a framing module.

* * * * *